(12) United States Patent
Takeda et al.

(10) Patent No.: US 10,306,561 B2
(45) Date of Patent: May 28, 2019

(54) USER TERMINAL, RADIO BASE STATION, RADIO COMMUNICATION METHOD AND RADIO COMMUNICATION SYSTEM

(71) Applicant: NTT DOCOMO, INC., Tokyo (JP)

(72) Inventors: Kazuki Takeda, Tokyo (JP); Kunihiko Teshima, Tokyo (JP); Tooru Uchino, Tokyo (JP); Kei Andou, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 15/873,525

(22) Filed: Jan. 17, 2018

(65) Prior Publication Data

US 2018/0160375 A1 Jun. 7, 2018

Related U.S. Application Data

(63) Continuation of application No. 15/309,368, filed as application No. PCT/JP2015/063244 on May 8, 2015, now abandoned.

(30) Foreign Application Priority Data

May 8, 2014 (JP) ................................. 2014-097079

(51) Int. Cl.
*H04W 52/14* (2009.01)
*H04W 52/40* (2009.01)
(Continued)

(52) U.S. Cl.
CPC ......... *H04W 52/146* (2013.01); *H04W 52/16* (2013.01); *H04W 52/267* (2013.01);
(Continued)

(58) Field of Classification Search
CPC . H04W 52/146; H04W 52/34; H04W 52/367; H04W 52/281; H04L 5/14; H04L 5/0041
See application file for complete search history.

(56) References Cited

U.S. PATENT DOCUMENTS 8,036,151 B2 * 10/2011 Das ....................... H04L 1/0002
370/248
8,687,541 B2    4/2014 Lohr et al.
(Continued)

FOREIGN PATENT DOCUMENTS

JP     2013529403 A    7/2013

OTHER PUBLICATIONS

International Search Report issued in PCT/JP2015/063244, dated Jul. 28, 2015 (2 pages).
(Continued)

*Primary Examiner* — Bobbak Safaipour
(74) *Attorney, Agent, or Firm* — Osha Liang LLP

(57) ABSTRACT

A user terminal is disclosed that connects with a plurality of radio base stations and the decrease of uplink throughput is reduced. A user terminal connects with a plurality of radio base stations including a first radio base station and a second radio base station, and this user terminal has a transmission section that transmits uplink signals to each radio base station, a receiving section that receives terminal-specific information with respect to the first radio base station, related to the maximum transmission power of the uplink signals, and a maximum transmission power setting section that sets the maximum transmission power for the first radio base station based on the terminal-specific information with respect to the first radio base station.

5 Claims, 10 Drawing Sheets

(51) Int. Cl.
| | |
|---|---|
| *H04W 52/26* | (2009.01) |
| *H04W 52/36* | (2009.01) |
| *H04W 52/16* | (2009.01) |
| *H04W 52/30* | (2009.01) |
| *H04W 72/04* | (2009.01) |
| *H04W 52/34* | (2009.01) |
| *H04W 76/15* | (2018.01) |

(52) U.S. Cl.
CPC .......... *H04W 52/30* (2013.01); *H04W 52/36* (2013.01); *H04W 52/367* (2013.01); *H04W 52/40* (2013.01); *H04W 72/04* (2013.01); *H04W 52/34* (2013.01); *H04W 76/15* (2018.02)

(56) References Cited

U.S. PATENT DOCUMENTS

| | | | | |
|---|---|---|---|---|
| 9,072,062 | B2* | 6/2015 | Xiao | H04W 52/30 |
| 9,386,619 | B2* | 7/2016 | Wu | H04W 76/15 |
| 9,603,098 | B2* | 3/2017 | Ryoo | H04W 52/146 |
| 2013/0176953 | A1 | 7/2013 | Stern-Berkowitz et al. | |
| 2015/0195795 | A1* | 7/2015 | Loehr | H04W 52/365 |
| | | | | 455/522 |
| 2016/0014704 | A1* | 1/2016 | Kim | H04W 52/365 |
| | | | | 370/252 |
| 2016/0073427 | A1* | 3/2016 | Worrall | H04W 28/0278 |
| | | | | 370/329 |
| 2016/0174172 | A1* | 6/2016 | Rahman | H04W 52/246 |
| | | | | 455/522 |
| 2016/0212711 | A1* | 7/2016 | Yi | H04W 52/146 |
| 2017/0048803 | A1* | 2/2017 | Yi | H04W 52/146 |
| 2017/0164298 | A1* | 6/2017 | Ryoo | H04W 52/146 |

OTHER PUBLICATIONS

Written Opinion of the International Searching Authority issued in PCT/JP2015/063244, dated Jul. 28, 2015 (4 pages).
NTT DOCOMO; "Transmit power control for dual connectivity"; 3GPP TSG RAN WG1 Meeting #76bis, R1-141469; Shenzhen, China; Mar. 31-Apr. 4, 2014 (8 pages).
NEC; "UL power control and splitting in dual connectivity"; 3GPP TSG RAN WG1 Meeting #76bis, R1-141204; Shenzhen, China; Mar. 31-Apr. 4, 2014 (10 pages).
3GPP TS 36.300 V11.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)"; Dec. 2012 (208 pages).
Extended European Search Report issued in the counterpart European Patent Application No. 15788678.9, dated Oct. 2, 2017 (11 pages).
NTT DOCOMO; "Outcome of the email discussion [76b-08] on TPC aspects of Dual Connectivity"; 3GPP TSG RAN WG1 Meeting #76bis, R1-141899; Shenzhen, China, Mar. 31-Apr. 4, 2014 (30 pages).
LG Electronics; "Power control for dual connectivity"; 3GPP TSG RAN WG1 Meeting #76bis, R1-141344; Shenzhen, China, Mar. 31-Apr. 4, 2014 (7 pages).
Office Action issued in corresponding European Application No. 15788678.9, dated Dec. 18, 2018 (7 pages).
Office Action issued in the counterpart European Patent Application No. 15788678.9, dated May 2, 2018 (7 pages).

* cited by examiner

CARRIER AGGREGATION

DUAL CONNECTIVITY

CARRIER AGGREGATION

DUAL CONNECTIVITY

DUAL CONNECTIVITY

USER TERMINAL, RADIO BASE STATION, RADIO COMMUNICATION METHOD AND RADIO COMMUNICATION SYSTEM

CROSS-REFERENCE TO RELATED APPLICATIONS

The present application is a continuation application and, thereby, claims benefit under 35 U.S.C. § 120 to U.S. patent application Ser. No. 15/309,368 filed on Nov. 7, 2016, titled, "USER TERMINAL, RADIO BASE STATION AND RADIO COMMUNICATION METHOD," which is a national stage application of PCT Application No. PCT/JP2015/063244, filed on May 8, 2015, which claims priority to Japanese Patent Application No. 2014-097079 filed on May 8, 2014. The contents of the foregoing applications are incorporated by reference in their entirety.

TECHNICAL FIELD

The present invention relates to a user terminal, a radio base station, a radio communication method and a radio communication system in a next-generation mobile communication system.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

Successor systems of LTE—referred to as, for example, "LTE-advanced" or "LTE enhancement"—have been under study for the purpose of achieving further broadbandization and increased speed beyond LTE, and the specifications thereof have been drafted as LTE Rel. 10/11. Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When a plurality of cells are formed by the same radio base station in effect, the above-described CA is applicable. On the other hand, a study is also in progress to employ dual connectivity (DC) when cells are formed by completely different radio base stations.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

As noted earlier, when a plurality of cells are formed in effect by the same radio base station (for example, when CA is employed), the radio base station can control uplink transmission power by taking into account the uplink transmission power of user terminals in each cell in a comprehensive manner. However, as in dual connectivity, when a plurality of radio base stations all control the uplink transmission power of user terminals separately, this may result in a drop of uplink throughput, a deterioration of communication quality and so on.

The present invention has been made in view of the above, and it is therefore an object of the present invention to provide a user terminal, a radio base station, a radio communication method and a radio communication system that can reduce the decrease of uplink throughput when a user terminal connects with a plurality of radio base stations.

Solution to Problem

A user terminal according to an example of the present invention provides a user terminal that connects with a plurality of radio base stations including a first radio base station and a second radio base station, and this user terminal has a transmission section that transmits uplink signals to each radio base station, a receiving section that receives terminal-specific information with respect to the first radio base station, related to maximum transmission power of the uplink signals, and a maximum transmission power setting section that sets the maximum transmission power for the first radio base station based on the terminal-specific information with respect to the first radio base station.

Advantageous Effects of Invention

According to the present invention, the decrease of uplink throughput when a user terminal connects with a plurality of radio base stations can be reduced.

DESCRIPTION OF EMBODIMENTS

Now, embodiments of the present invention will be described below in detail with reference to the accompanying drawings.

Carrier aggregation and dual connectivity are both techniques to allow a user terminal to connect and communicate with a plurality of cells at the same time, and are applied to, for example, a HetNet (Heterogeneous Network). Here, the "HetNet," which is under study in LTE-A systems, refers to a structure in which small cells, each having a local coverage area of a radius of approximately several tens of meters, are formed within a macro cell having a wide coverage area of a radius of approximately several kilometers. Note that carrier aggregation may be referred to as "intra-eNB CA," and dual connectivity may be referred to as "inter-eNB CA."

FIG. 1 provide schematic diagrams of carrier aggregation and dual connectivity. In the examples shown in FIG. 1, a user terminal UE communicates with radio base stations eNB1 and eNB2.

FIG. 1 show control signals that are transmitted and received via a physical downlink control channel (PDCCH) and a physical uplink control channel (PUCCH). For example, downlink control information (DCI) is transmitted via the PDCCH, and uplink control information (UCI) is transmitted via the PUCCH. Note that an enhanced physical downlink control channel (EPDCCH: Enhanced PDCCH) may be used instead of the PDCCH.

Figure 1A:
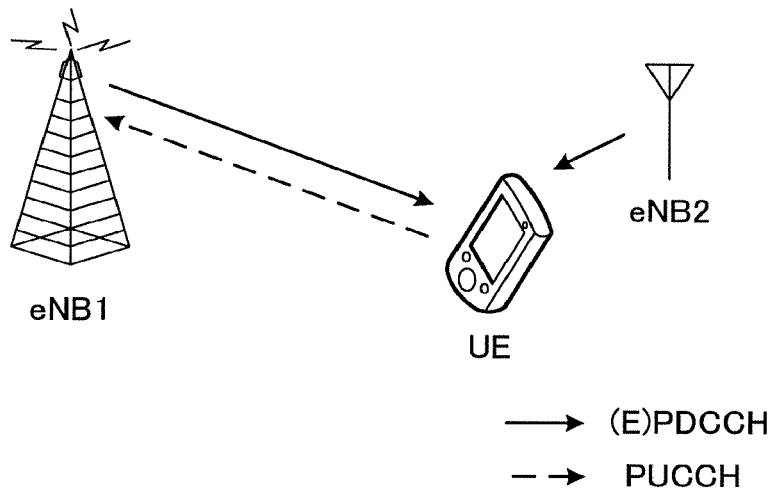
FIGS. 1A and 1B provide schematic diagrams of carrier aggregation and dual connectivity.

FIG. 1A shows communication among the radio base station eNB1 and eNB2 and the user terminal UE by way of carrier aggregation. In the example shown in FIG. 1A, eNB1 is a radio base station to form a macro cell (hereinafter referred to as a "macro base station"), and eNB2 is a radio base station to form a small cell (hereinafter referred to as a "small base station").

For example, the small base station may be structured like an RRH (Remote Radio Head) that connects with the macro base station. When carrier aggregation is employed, one scheduler (for example, the scheduler provided in macro base station eNB1) controls the scheduling of multiple cells.

In a structure in which a scheduler provided in a macro base station controls the scheduling of multiple cells, each base station may be connected using, for example, an ideal backhaul that provides a high speed channel such as optical fiber.

Figure 1B:
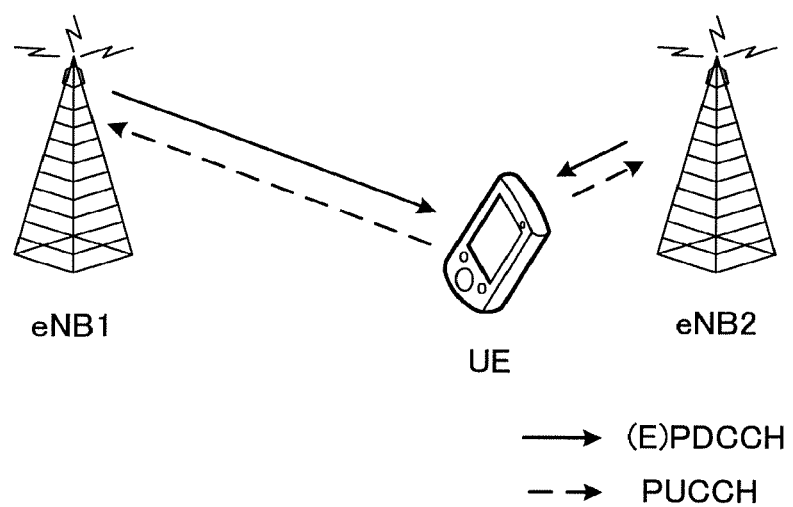

FIG. 1B shows communication among radio base stations eNB1 and eNB2 and a user terminal UE by way of dual connectivity (DC). In the example shown in FIG. 1B, eNB1 and eNB2 are both macro base stations.

When dual connectivity (DC) is employed, a plurality of schedulers are provided independently, and these multiple schedulers (for example, the scheduler provided in macro base station eNB1 and the scheduler provided in macro base station eNB2) each control the scheduling of one or more cells they have control over.

In the structure in which the scheduler provided in macro base station eNB1 and the scheduler provided in macro base station eNB2 each control the scheduling of one or more cells they have control over, each base station may be connected using, for example, a non-ideal backhaul, such as the X2 interface, which produces delays that cannot be ignored.

Consequently, it is generally assumed that, in dual connectivity, close coordinated control between eNBs equivalent to carrier aggregation cannot be executed. Consequently, downlink L1/L2 control (PDCCH/EPDCCH) and uplink L1/L2 control (UCI feedback by the PUCCH/PUSCH) needs to be carried out independently in each eNB.

FIG. 2 provide diagrams to show example cell structures in carrier aggregation and dual connectivity. In FIG. 2, the UE is connected with five cells (C1 to C5). C1 is a PCell (Primary Cell), and C2 to C5 are SCells (Secondary Cells).

Figure 2A:
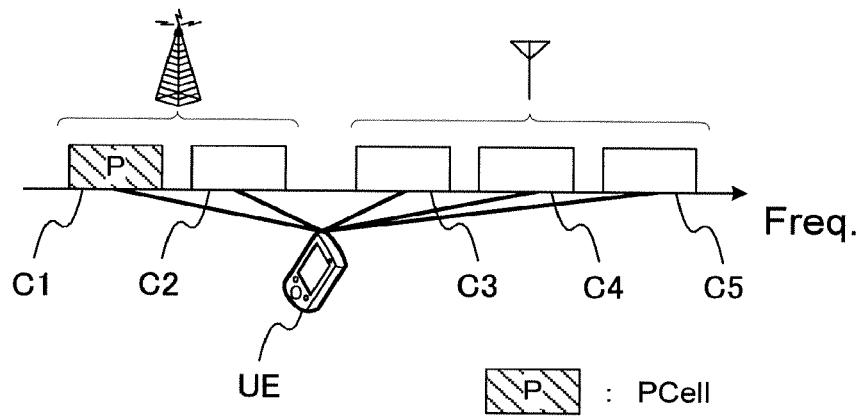
FIGS. 2A and 2B provide diagrams to show example cell structures in carrier aggregation and dual connectivity.
Figure 2B:
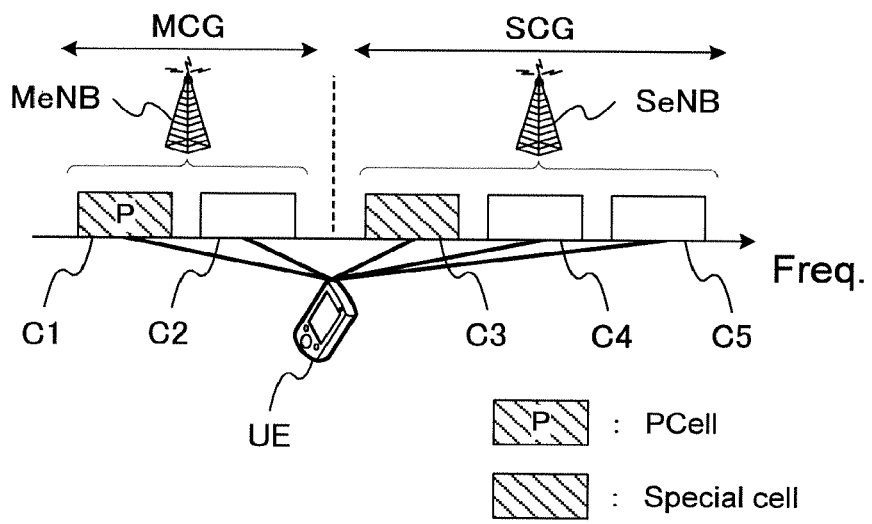

As shown in FIG. 2A, in carrier aggregation, uplink control signals are transmitted via the PCell, so that the SCells do not have to have the functions of the PCell.

As shown in FIG. 2, in dual connectivity (DC), each radio base station configures a cell group (CG) that is comprised of one or a plurality of cells. Each cell group is comprised of one or more cells formed by the same radio base station, or one or more cells formed by the same transmission point such as a transmitting antenna apparatus, a transmission station and so on.

The cell group to include the PCell will be referred to as the "master cell group (MCG: Master CG)," and cell groups other than the MCG will be referred to as "secondary cell groups (SCGs: Secondary CGs)." In each cell group, two or more cells can execute carrier aggregation.

Also, the radio base station where the MCG is configured will be referred to as the "master base station (MeNB: Master eNB)," and a radio base station where an SCG is configured will be referred to as a "secondary base station (SeNB: Secondary eNB)." Hereinafter, a radio base station or a cell group will be also referred to as an "eNB/CG."

Note that the total number of cells to constitute the MCG and the SCGs is configured to be equal to or less than a predetermined value (for example, five (cells)). This predetermined value may be set in advance, or may be configured semi-statically or dynamically between radio base stations eNB and user terminals UE. Also, depending on the implementation of the user terminals UE, the value of the sum of the cells to constitute the MCG and the SCGs and the combination of cells that can be configured may be reported to the radio base stations eNB in the form of user terminal capability information (UE capability information).

In dual connectivity, as noted earlier, significant backhaul delays may be produced between eNBs. Consequently, in order to allow each eNB to transmit and receive control information to and from UEs independently, even an SeNB requires a cell (also referred to as a "special cell," a "PUCCH configured cell" and so on) that is special and has functions (common search space, the PUCCH, etc.) equivalent to those of the PCell. In the example FIG. 2B, cell C3 is configured as such as special a cell.

Figure 3:
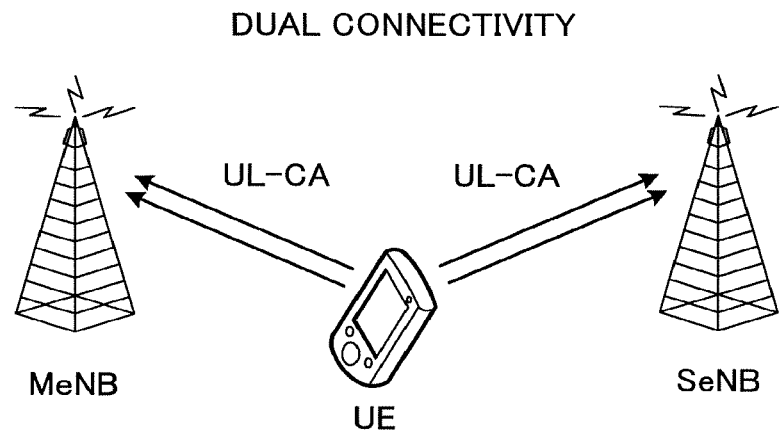
FIG. 3 is a diagram to show an example case of connecting with each radio base station by way of UL-CA, in dual connectivity.

As described above, in dual connectivity, a user terminal has to connect with each of a plurality of radio base stations in at least one uplink serving cell. Furthermore, a study is in progress to carry out UL-CA (uplink carrier aggregation) to involve two or more uplink serving cells for each radio base station. FIG. 3 is a diagram to show an example case of connecting with each radio base station by way of UL-CA, in dual connectivity. In FIG. 3, the user terminal connects with the MeNB and the SeNB via UL-CA.

Here, uplink signal transmission timings are controlled separately between the MeNB and the SeNB. Furthermore, uplink signal transmission power control is also carried out separately between the MeNB and the SeNB. Consequently, cases might occur in which, in timings where uplink signal transmissions for the MeNB and the SeNB overlap, uplink signal transmissions to exceed the maximum allowable power ($P_{CMAX}$) of the user terminal are demanded. "Power-limited" will refer to the state in which transmission power is limited because uplink signal transmissions to exceed the maximum allowable power of a user terminal are demanded.

When this takes place, the user terminal has to lower the transmission power down to or below the maximum allowable power by reducing the transmission power, by dropping the transmission signals, and so on, based on some rules. Nevertheless, when the user terminal manipulates its uplink signal transmission power, there is a threat of causing an unintended a deterioration of uplink signal quality in the radio base stations, which then might result in increased retransmissions, a decrease of throughput, and so on.

Existing LTE systems (up to LTE Rel. 11) only stipulate the maximum transmission power per UE ($P_{CMAX}$), and the maximum transmission power per serving cell ($P_{CMAX,c}$). These are determined by a user terminal based on the value of $P_{EMAX,c}$ (or $P_{EMAX}$) reported in a broadcast signal (for example, SIB1). Consequently, it is not possible to report different values flexibly, on a per user terminal basis. Consequently, with existing LTE systems, it is not possible to execute adequate transmission power control on a per user terminal basis to reduce the decrease of throughput.

Figure 4:
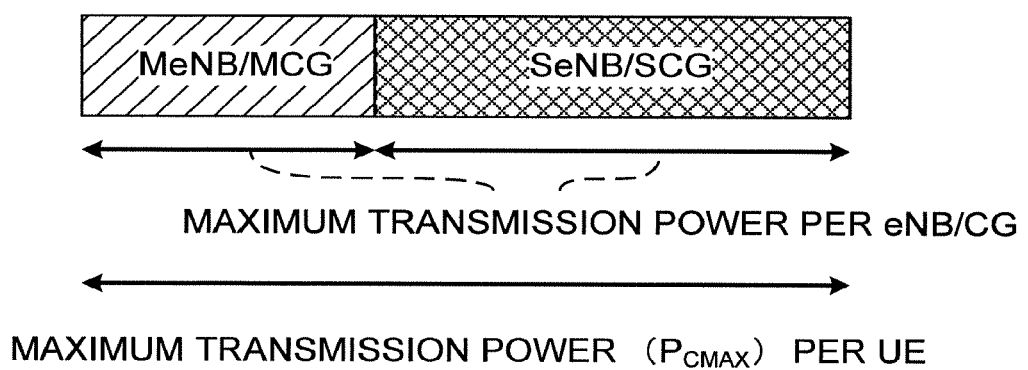
FIG. 4 is a diagram to show an example of uplink transmission power that can be allocated in a user terminal.

In order to solve this problem, the present inventors have come up with the idea of setting the maximum transmission power that can be used in transmissions in the MeNB/MCG and the SeNB, semi-statically—that is, on a per user terminal basis, on a per CG basis, and so on. FIG. 4 is a diagram to show an example of uplink transmission power that can be allocated in the user terminal. In FIG. 4, the maximum transmission power per MeNB/MCG and the maximum transmission power per SeNB/SCG are configured within the maximum transmission power ($P_{CMAX}$) per UE. By this means, the MeNB/MCG and the SeNB/SCG no longer have to compete (or fight) with each other for more power that can be allocated, so that it is possible to carry out transmissions, in a reliable fashion, with the power demanded by the eNBs.

Furthermore, to bring the above-noted conception into practice, the present inventors have focused on the fact that, when dual connectivity is not employed, the maximum transmission power per serving cell ($P_{CMAX,c}$) assumes values that are set by user terminals within a range between an upper limit and a lower limit.

Figure 5:
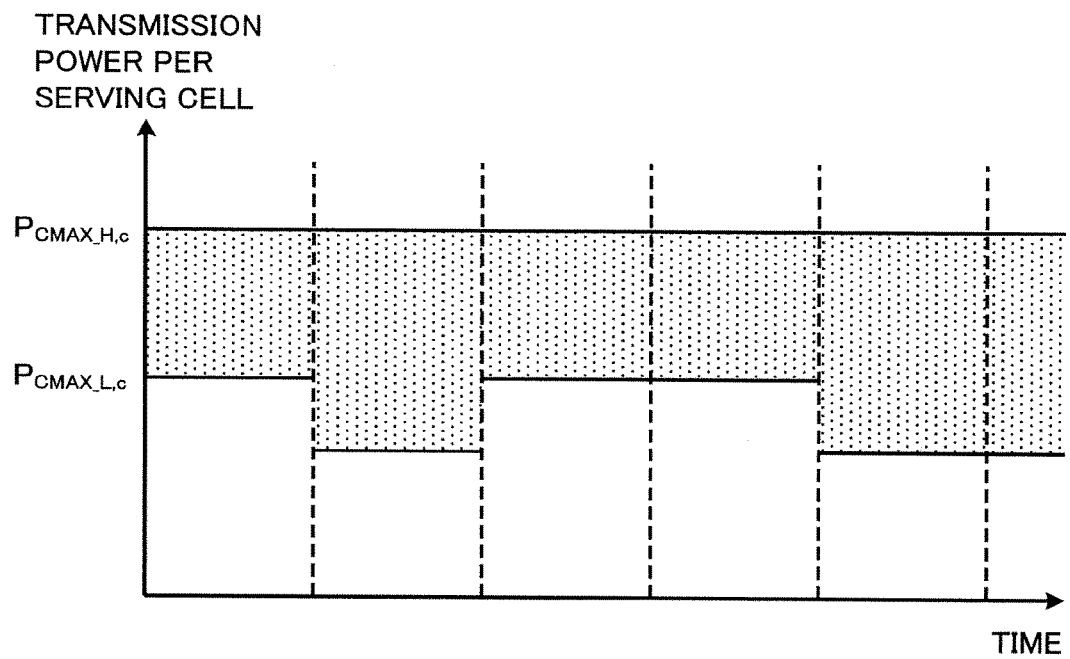
FIG. 5 is a diagram to explain an example where the maximum transmission power per serving cell varies per subframe.

FIG. 5 is a diagram to explain an example where the maximum transmission power per serving cell varies per subframe. $P_{CMAX,c}$ is set by a user terminal, on a per subframe basis, so that $P_{CMAX\_L,c} \leq P_{CMAX,c} \leq P_{CMAX\_H,c}$ holds. The upper limit $P_{CMAX\_H,c}$ and the lower limit $P_{CMAX\_L,c}$ are each stipulated as follows:

$$P_{CMAX\_H,c} = \text{MIN}\{P_{EMAX,c}, P_{PowerClass}\} \quad \text{(Equation 1)}$$

$$P_{CMAX\_L,c} = \text{MIN}\{P_{EMAX,c} - \Delta T_{C,c}, P_{PowerClass} - \text{MAX}(MPR_c + A - MPR_c + \Delta T_{IB,c} + \Delta T_{C,c}, P - MPR_c)\} \quad \text{(Equation 2)}$$

Here, $P_{EMAX,c}$ is a value that is set by higher layer signaling (for example, a broadcast signal), in the serving cell, and $P_{PowerClass}$ is a predetermined value. $\Delta T_{C,c}$ and $\Delta T_{IB,c}$ are offset values, and are set, for example, to cancel user terminal-specific errors. $MPR_c$ is the maximum power reduction (MPR) in the serving cell, and is a value that changes depending on the MCS (Modulation and Coding Scheme) and/or the number of PRBs (Physical Resource Blocks). A-$MPR_c$ is additional maximum power reduction (additional MPR). P-$MPR_c$ is a value for use in power control. Note that MIN and MAX represent the functions for picking up the minimum value and the maximum value from the list of arguments.

The upper limit $P_{CMAX\_H,c}$ is set by $P_{EMAX,c}$ or the predetermined value $P_{PowerClass}$, and therefore does not change. Meanwhile, although the lower limit $P_{CMAX\_L,c}$ may change depending on the MPR, since the MPR also changes depending on the MCS, the number of PRBs and so on, and therefore the lower limit $P_{CMAX\_L,c}$ might change on a per subframe. It then follows that, $P_{CMAX,c}$, which is set between these upper limit and lower limit, might change per subframe as well. Also, $P_{CMAX}$ may change per subframe as well.

From the above perspectives, the present inventors have worked on replacing $P_{EMAX,c}$ in equations 1 and 2 with specific values that are reported per user terminal and/or per CG, when dual connectivity is employed, and arrived at the present invention. To be more specific, the present inventors have conceived of replacing $P_{EMAX,c}$ with user terminal-specific (UE-specific) values that are reported via higher layer signaling. According to this structure, for example, when an MeNB and an SeNB are each one CC, it is possible to realize semi-static distribution of transmission power, per user terminal and/or per CG, by setting the sum of the user terminal-specific values to be equal to or lower than $P_{CMAX}$.

Now, embodiments of the present invention will be described below in detail. Note that, although, for ease of explanation, examples will be described below in which a user terminal connects with two radio base stations (MeNB and SeNB) in dual connectivity, this is by no means limiting. For example, the present invention is applicable to cases where a user terminal connects and communicates with three or more radio base stations that each execute control with an independent scheduler. Furthermore, it is equally possible to employ a structure in which a user terminal connects with cell groups, instead of radio base stations.

First Embodiment

With a first embodiment of the present invention, user terminals set $P_{CMAX,c}$ by using user terminal-specific values (terminal-specific information). To draw distinction from existing $P_{EMAX,c}$, the terminal-specific information according to the first embodiment will be referred to as "$Q_{EMAX,c}$." Note that the terminal-specific information is by no means limited to this name.

Each eNB reports the maximum transmission power per serving cell, $Q_{EMAX,c}$, to the user terminals that are connected in dual connectivity, through higher layer signaling (for example, RRC signaling). $Q_{EMAX,c}$ may be included and reported in information elements (also referred to as "IEs"). Note that the sum of $Q_{EMAX,c}$ of the serving cells of each eNB is preferably configured to a value equal to or less than $P_{CMAX}$.

A user terminal sets $P_{CMAX,c}$ in accordance with each serving cell's $Q_{EMAX,c}$ that is reported. For example, if $Q_{EMAX,c}$ reported from an MeNB is $Q_{EMAX\_MeNB,c}$ and $Q_{EMAX,c}$ reported from an SeNB is $Q_{EMAX\_SeNB,c}$, for the upper limit $P_{CMAX\_eNB\_H,c}$ and the lower limit $P_{CMAX\_eNB\_L,c}$ of the maximum transmission power per serving cell formed by each eNB, $P_{CMAX\_MeNB\_H,c}$, $P_{CMAX\_MeNB\_L,c}$, $P_{CMAX\_SeNB\_H,c}$ and $P_{CMAX\_SeNB\_L,c}$ can be represented as shown in equations 3 to 6, respectively.

$$P_{CMAX\_MeNB\_H,c} = \text{MIN}\{Q_{EMAX\_MeNB,c}, P_{PowerClass}\} \quad \text{(Equation 3)}$$

$$P_{CMAX\_MeNB\_L,c} = \text{MIN}\{Q_{EMAX\_MeNB,c} - \Delta T_{C,c},\\ P_{PowerClass} - \text{MAX}(\text{MPR}_c + A\text{-MPR}_c + \Delta T_{IB,c} + \Delta T_{C,c}, P\text{-MPR}_c)\} \quad \text{(Equation 4)}$$

$$P_{CMAX\_SeNB\_H,c} = \text{MIN}\{Q_{EMAX\_SeNB,c}, P_{PowerClass}\} \quad \text{(Equation 5)}$$

$$P_{CMAX\_SeNB\_L,c} = \text{MIN}\{Q_{EMAX\_SeNB,c} - \Delta T_{C,c},\\ P_{PowerClass} - \text{MAX}(\text{MPR}_c + A\text{-MPR}_c + \Delta T_{IB,c} + \Delta T_{C,c}, P\text{-MPR}_c)\} \quad \text{(Equation 6)}$$

The user terminal sets the maximum transmission power per serving cell formed by the MeNB, $P_{CMAX\_MeNB,c}$, between the upper limit and the lower limit calculated based on equations 3 and 4. Also, the user terminal calculates the maximum transmission power per serving cell formed by the SeNB, $P_{CMAX\_SeNB,c}$, between the upper limit and the lower limit calculated based on equations 5 and 6. Note that, although, in equation 4 and equation 6, $\Delta T_{C,c}$ is subtracted from both $Q_{EMAX\_MeNB,c}$ and $Q_{EMAX\_SeNB,c}$ $\Delta T_{C,c}$ in these terms may be 0 (that is, unmitigated).

Note that, when every serving cell's $Q_{EMAX,c}$ is not particularly signaled, the user terminal sets each $P_{CMAX,c}$ ($P_{CMAX\_MeNB,c}$ and $P_{CMAX\_SeNB,c}$) by using $P_{EMAX,c}$ that is designated in SIB1. That is, as when dual connectivity is not employed, the transmission power of each serving cell is determined by using equations 1 and 2. Also, when $Q_{EMAX,c}$ is not signaled in a specific serving cell, $P_{CMAX,c}$ is set by using $P_{EMAX,c}$ in this serving cell.

As described above, according to the first embodiment, $Q_{EMAX,c}$ can be controlled flexibly, per user terminal and/or per cell, so that, even in dual connectivity, it is possible to change the ratio of power to allocate to serving cells formed by each eNB, and reduce the decrease of uplink throughput. Also, given that few changes are made to the existing rule of determining $P_{CMAX,c}$, there is little impact on the implementation of user terminals.

Second Embodiment

Similar to $P_{CMAX,c}$, the maximum transmission power per UE, $P_{CMAX}$, is a value that is determined by a user terminal in a range between an upper limit and a lower limit. Here, the upper limit $P_{CMAX\_H}$ and the lower limit $P_{CMAX\_L}$ of $P_{CMAX}$ are each defined as follows:

$$P_{CMAX\_H} = \text{MIN}\{10 \log_{10} \Sigma p_{EMAX,c}, P_{PowerClass}\} \quad \text{(Equation 7)}$$

$$P_{CMAX\_L} = \text{MIN}\{10 \log_{10} \Sigma \text{MIN}[p_{EMAX,c}/(\Delta t_{C,c}),\\ P_{Powerclass}/(\text{mpr}_c \cdot a\text{-mpr}_c \cdot \Delta t_{C,c} \cdot \Delta t_{IB,c}),\\ p_{Powerclass}/\text{pmpr}_c], P_{PowerClass}\} \quad \text{(Equation 8)}$$

Here, $p_{EMAX,c}$, $p_{PowerClass}$, $\text{mpr}_c$, a-$\text{mpr}_c$, $\text{pmpr}_c$, $\Delta t_{C,c}$ and $\Delta t_{IB,c}$ are the linear values of $P_{EMAX,c}$, $P_{PowerClass}$, $\text{MPR}_c$, A-$\text{MPR}_c$, P-$\text{MPR}_c$, $\Delta T_{C,c}$ and $\Delta T_{IB,c}$, respectively. Note that, when X is the linear value of x, this means that x and X are given by $x = 10 \log_{10}(X)$ and $X = 10^{(x/10)}$, respectively.

$P_{CMAX}$ is set by a user terminal, on a per subframe, so that $P_{CMAX\_L} \leq P_{CMAX} \leq P_{CMAX\_H}$ holds. As described above, in the present LTE system, the maximum transmission power per eNB/CG cannot be set semi-statically, per user terminal and/or per CG.

So, with a second embodiment of the present invention, a user terminal sets $P_{CMAX}$ by using user terminal-specific values (terminal-specific information). The terminal-specific information according to the second embodiment will be referred to as "$P_{eNB}$."

Each eNB reports (configures) the maximum transmission power $P_{eNB}$ of that eNB to the user terminals connected in dual connectivity, through higher layer signaling (for example, RRC signaling). Each $P_{eNB}$ may be included and reported in information elements. Note that the sun of each eNB's $P_{eNB}$ is preferably configured to be value equal to or less than $P_{CMAX}$.

A user terminal sets $P_{CMAX\_eNB}$ per eNB ($P_{CMAX}$ for the eNB) according to the maximum transmission power per eNB, $P_{eNB}$. For example, if $P_{eNB}$ reported from an MeNB is $P_{MeNB}$ and $P_{eNB}$ reported from an SeNB is $P_{SeNB}$, the upper limit and the lower limit of the maximum transmission power per eNB—$P_{CMAX\_MeNB\_H}$, $P_{CMAX\_MeNB\_L}$, $P_{CMAX\_SeNB\_H}$ and $P_{CMAX\_SeNB\_L}$—can be represented as shown by equations 9 to 12, respectively:

$$P_{CMAX\_MeNB\_H} = \text{MIN}\{P_{MeNB}, 10 \log_{10} \Sigma p_{EMAX,c},\\ P_{PowerClass}\} \quad \text{(Equation 9)}$$

$$P_{CMAX\_MeNB\_L} = \text{MIN}\{10 \log_{10} \Sigma p_{MeNB}/\Delta t_{C,c}, 10 \log_{10} \Sigma \text{MIN}[p_{EMAX,c}/(\Delta t_{C,c}), p_{PowerClass}/(\text{mpr}_c \cdot a\text{-mpr}_c \cdot \Delta t_{C,c} \cdot \Delta t_{IB,c}), p_{PowerClass}/\text{pmpr}_c], P_{PowerClass}\} \quad \text{(Equation 10)}$$

$$P_{CMAX\_SeNB\_H} = \text{MIN}\{P_{SeNB}, 10 \log_{10} \Sigma p_{EMAX,c},\\ P_{PowerClass}\} \quad \text{(Equation 11)}$$

$$P_{CMAX\_SeNB\_L} = \text{MIN}\{10 \log_{10} \Sigma p_{SeNB}/\Delta t_{C,c}, 10 \log_{10} \Sigma \text{MIN}[p_{EMAX,c}/(\Delta t_{C,c}), p_{PowerClass}/(\text{mpr}_c \cdot a\text{-mpr}_c \cdot \Delta t_{C,c} \cdot \Delta t_{IB,c}), p_{PowerClass}/\text{pmpr}_c], P_{PowerClass}\} \quad \text{(Equation 12)}$$

Here, $\Sigma$ in the right terms in equations 9 to 12 represents determining the sum of the serving cells belonging to the MeNB/MCG in the event of equations 9 and 10, and represents determining the sum of the serving cells belonging to the SeNB/SCG in the event of equations 11 and 12. Also, $p_{MeNB}$ and $p_{SeNB}$ are the linear values of $P_{MeNB}$ and $P_{SeNB}$, respectively.

The user terminal sets the maximum transmission power per MeNB, $P_{CMAX\_MeNB}$ between the upper limit and the lower limit based on equations 9 and 10. Also, the user terminal sets the maximum transmission power per SeNB, $P_{CMAX\_SeNB}$ between the upper limit and the lower limit calculated based on equations 11 and 12. By this means, as shown in FIG. 4, it is possible to set the maximum transmission power per MeNB ($P_{CMAX\_MeNB}$) and the maximum transmission power per SeNB ($P_{CMAX\_SeNB}$) within the maximum transmission power per UE ($P_{CMAX}$).

Note that no problem arises even when $10 \log_{10} \Sigma p_{MeNB}/\Delta t_{C,c}$ and $10 \log_{10} \Sigma p_{SeNB}/\Delta t_{C,c}$ in equations 10 and 12 are replaced with $P_{MeNB}$ and $P_{SeNB}$ (that is, when no mitigated values are applied). Also, $P_{Powerclass}$ included in the right terms equations 9 to 12 can be removed as long as $P_{MeNB}$ and $P_{SeNB}$ are configured within a range to fulfill $P_{MeNB} \leq P_{Powerclass}$ and $P_{SeNB} \leq P_{Powerclass}$.

Also, when each eNB's $P_{eNB}$ is not particularly signaled, as when dual connectivity is not employed, a user terminal can determine the maximum transmission power of each eNB by using equations 7 and 8. When $P_{eNB}$ is not signaled in a specific eNB, the maximum transmission power for this eNB is set using equations 7 and 8.

As described above, according to the second embodiment, the maximum transmission power $P_{eNB}$ of each eNB can be controlled flexibly, on a per user terminal basis, so that, even in dual connectivity, it is possible to change the ratio of power to allocate to each eNB flexibly, and reduce the decrease of uplink throughput. Also, given that few changes are made to the existing rule of determining $P_{CMAX,c}$, there is little impact on the implementation of user terminals.

Third Embodiment

As described above, to divide transmission power completely between an MeNB/MCG and an SeNB/SCG, it is necessary to make sure that the maximum value of the maximum transmission power of both eNBs/CGs—that is, the sum of $P_{CMAX\_eNB\_H}$ and/or the sum of $P_{CMAX\_eNB\_H,c}$—does not exceed $P_{CMAX}$. However, the actual maximum transmission power is set by user terminals from the configuration range. Consequently, in both eNBs/CGs, there is little likelihood that power is used up to $P_{CMAX\_eNB\_H}$ and/or $P_{CMAX\_eNB\_H,c}$. In this way, setting the maximum transmission power in each eNB/CG separately may have the risk that power is not allocated efficiently.

Figure 6:
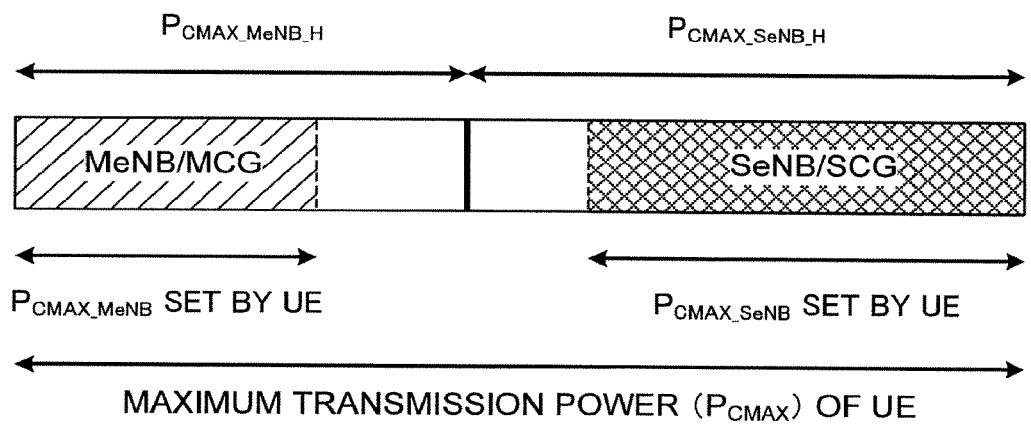
FIG. 6 is a diagram to show an example of uplink transmission power that can be allocated in a user terminal.

Now, this problem will be described in detail with reference to FIG. 6. FIG. 6 is a diagram to show an example of uplink transmission power that can be allocated in a user terminal. In FIG. 6, $P_{CMAX\_MeNB\_H}$, $P_{CMAX\_MeNB\_L}$, $P_{CMAX\_SeNB\_H}$ and $P_{CMAX\_SeNB\_L}$ are determined using the method described with the second embodiment, and $P_{CMAX\_MeNB}$ and $P_{CMAX\_SeNB}$ are set. In this case, power to match the proportion of ($P_{CMAX\_MeNB\_H}-P_{CMAX\_MeNB}$) is not allocated to the MeNB, and power to match the proportion of ($P_{CMAX\_SeNB\_H}-P_{CMAX\_SeNB}$) is not allocated to the SeNB, which has a threat of resulting in a decrease of uplink throughput.

So, with a third embodiment of the present invention, in order to solve the above problem, instead of calculating the upper limit ($P_{CMAX\_eNB\_H}$) of the maximum transmission power of each eNB individually, $P_{CMAX\_eNB}$ for another eNB is set by calculating $P_{CMAX\_eNB\_H}$ for the other eNB by using $P_{CMAX\_eNB}$ that is set with respect to a given eNB.

To be more specific, based on $P_{CMAX\_eNB\_H}$ and $P_{CMAX\_eNB\_L}$ for one eNB, $P_{CMAX\_eNB}$ for this eNB is determined. After that, the other eNB's $P_{CMAX\_eNB\_H}$ is set based on the difference between $P_{CMAX}$ and $P_{CMAX\_eNB}$ that is determined first ($P_{CMAX}-P_{CMAX\_eNB}$).

Figure 7:
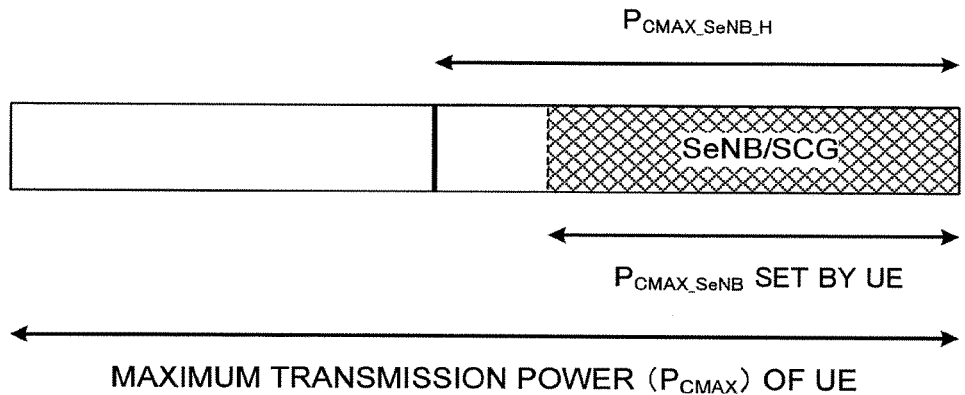
FIG. 7 is a diagram to explain a method of calculating the maximum transmission power per eNB/CG, according to a third embodiment of the present invention.
Figure 8:
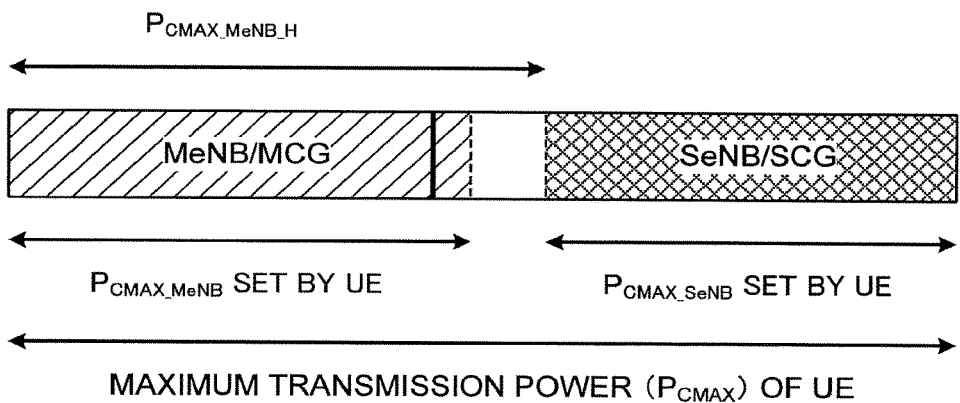
FIG. 8 is a diagram to explain a method of calculating the maximum transmission power per eNB/CG, according to a third embodiment of the present invention.

FIGS. 7 and 8 are each a diagram to explain a method of calculating the maximum transmission power per eNB/CG, according to the third embodiment of the present invention. In the examples of FIG. 7 and FIG. 8, $P_{CMAX\_SeNB}$ is determined first, and $P_{CMAX\_MeNB}$ is set. First, a user terminal determines $P_{CMAX\_SeNB}$ based on $P_{CMAX\_SeNB\_H}$ and $P_{CMAX\_SeNB\_L}$ that are calculated using equations 11 and 12 (FIG. 7).

Next, the user terminal sees ($P_{CMAX}-P_{CMAX\_SeNB}$) as $P_{CMAX\_MeNB\_H}$, determines $P_{CMAX\_MeNB\_L}$ from this by taking into account the MPR and so on, and sets $P_{CMAX\_MeNB}$ within the range of these (FIG. 8). At this time, the user terminal may see $P_{CMAX\_MeNB\_H}$ as the maximum transmission power per MeNB $P_{MeNB}$, and, for example, determine $P_{CMAX\_MeNB\_L}$ using equation 10.

By this means, it is possible to reduce the useless space in power where the maximum transmission power is not set. FIG. 6 makes it clear that the area where power is not allocated is smaller in FIG. 8. When the maximum transmission power for the SeNB is determined first, the area of ($P_{CMAX\_SeNB\_H}-P_{CMAX\_SeNB}$) can be re-used for power allocation, so that it is possible to use power efficiently. On the other hand, when the maximum transmission power for the MeNB is determined first, the area of ($P_{CMAX\_MeNB\_H}-P_{CMAX\_MeNB}$) can be used to allocate power to the SeNB.

As described above, according to the third embodiment, the user terminal does not determine the maximum transmission power of each eNB separately, but determines the maximum transmission power one by one. That is to say, once the maximum transmission power is determined with respect to a given eNB, the maximum transmission power in the rest of the eNBs can be determined within the range given by removing the maximum transmission power of the above given eNB from the maximum transmission power of the user terminal. By this means, the transmission power which the user terminal can use can be allocated to each eNB efficiently.

Note that, although, in the above-described example, the third embodiment is applied to the method of calculating the maximum transmission power per eNB/CG according to the second embodiment, it is equally possible to, for example, apply the third embodiment to the method of calculating the maximum transmission power per cell according to the first embodiment.

Furthermore, the order of determining the maximum transmission power per eNB in the third embodiment may be configured in user terminals in advance. For example, a stipulation to determine the maximum transmission power in the order of the SeNB and the MeNB may be set. Also, from the radio base stations, information regarding this order, information as to whether or not to determine the maximum transmission power of each radio base station separately and so on may be reported by higher layer signaling (for example, RRC signaling), by broadcast information, and so on. For example, information about the eNB where the maximum transmission power should be determined first may be included in the information elements to include terminal-specific information related to the maximum transmission power.

(Variation)

Note that the processes of setting the maximum transmission power, described with each of the above-described embodiments, can be applied even to cases where uplink signal transmission timings are not synchronized between a plurality of eNBs/CGs that are connected in dual connectivity (also referred to "as asynchronous dual connectivity").

Furthermore, in the maximum transmission power setting processes described with each of the above-described embodiments, the radio base stations require signaling for reporting specific information that relates to the maximum transmission power of uplink signals on a per user terminal basis, it is also possible to judge whether or not to report this signaling based on user terminal capability information (UE capability information).

To be more specific, in systems in which dual connectivity is used, user terminal capability information may be stipulated as follows. For example, user terminal capability information to represent whether or not the maximum transmission power can be set on a per radio base station may be stipulated. Also, user terminal capability information to represent whether or not asynchronous dual connectivity can be supported may be stipulated. Furthermore, user terminal capability information to represent whether or not the transmission power of future transmission signals can be calculated in advance may be stipulated. In addition, user terminal capability information to represent whether or not transmission power can be shared between eNBs/CGs on a dynamic basis may be stipulated as well.

The user terminal capability information may be reported from a user terminal to a radio base station in a stage before dual connectivity is configured. When, based on these pieces of user terminal capability information, the radio base station judges that the user terminal can perform the maximum transmission power setting processes according to the above embodiments, the radio base station may report user terminal-specific information. For example, when the radio base station judges that the user terminal cannot share transmission power on a dynamic basis between eNBs/CGs, in accordance with the above embodiments, the radio base station may distribute the maximum transmission power to the user terminal, semi-statically, on a per eNB/CG basis.

(Structure of Radio Communication System)

Now, a structure of a radio communication system according to an embodiment of the present invention will be described below. In this radio communication system, the radio communication methods according to the above-described embodiments are employed.

Figure 9:
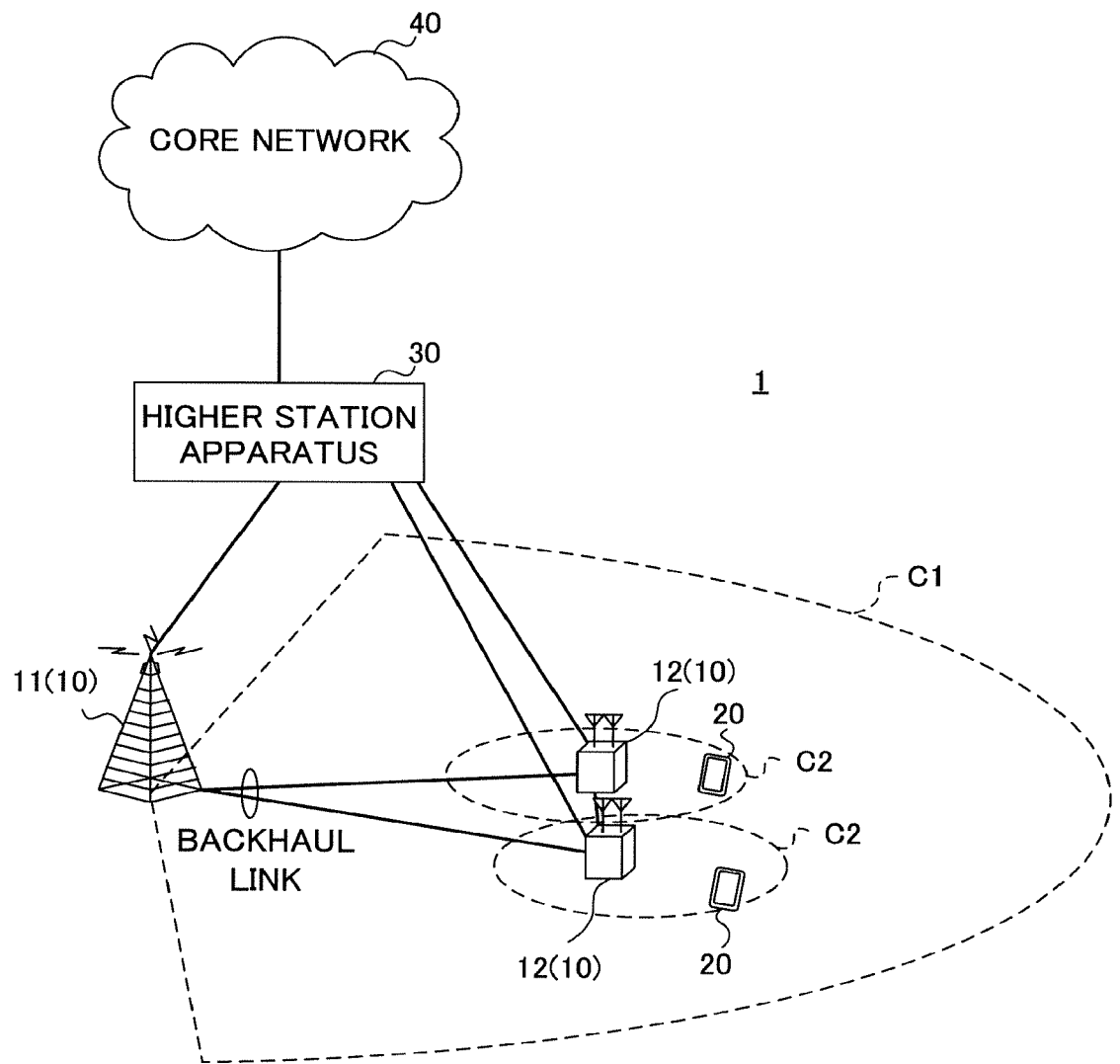
FIG. 9 is a diagram to show an example of a schematic structure of a radio communication system according to an embodiment of the present invention.

FIG. 9 is a schematic structure diagram to show an example of the radio communication system according to an embodiment of the present invention. As shown in FIG. 9, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 9, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 9.

The macro cell C1 and the small cells C2 may use the same frequency band or may use different frequency bands. Also, the radio base stations 11 and 12 are connected with each other via an inter-base station interface (for example, optical fiber, the X2 interface, etc.).

Note that the macro base station 11 may be referred to as an "eNodeB (eNB)," a "radio base station," a "transmission point" and so on. The small base stations 12 are radio base stations having local coverages, and may be referred to as "RRHs (Remote Radio Heads)," "pico base stations," "femto base stations," "HeNBs (Home eNodeBs)," "transmission points," "eNodeBs (eNBs)" and so on.

The user terminals 20 are terminals to support various communication schemes such as LTE, LTE-A and so on, and may include both mobile communication terminals and stationary communication terminals. The user terminals 20 can communicate with other user terminals 20 via the radio base stations 10.

Note that the higher station apparatus 30 may be, for example, an access gateway apparatus, a radio network controller (RNC), a mobility management entity (MME) and so on, but is by no means limited to these.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. Note that the uplink and downlink radio access schemes are not limited to the combination of these.

Also, in the radio communication system 1, a downlink shared channel (PDSCH: Physical Downlink Shared Channel), which is used by each user terminal 20 on a shared basis, downlink control channels (PDCCH (Physical Downlink Control Channel), EPDCCH (Enhanced Physical Downlink Control Channel), etc.), a broadcast channel (PBCH) and so on are used as downlink channels. User data, higher layer control information and predetermined SIBs (System Information Blocks) are communicated in the PDSCH. Downlink control information (DCI) is communicated using the PDCCH and/or the EPDCCH. Also, MIBs (Master Information Blocks) and so on are communicated by the PBCH.

Also, in the radio communication system 1, an uplink shared channel (PUSCH: Physical Uplink Shared Channel), which is used by each user terminal 20 on a shared basis, an uplink control channel (PUCCH: Physical Uplink Control Channel) and so on are used. User data and higher layer control information are communicated by the PUSCH.

Figure 10:
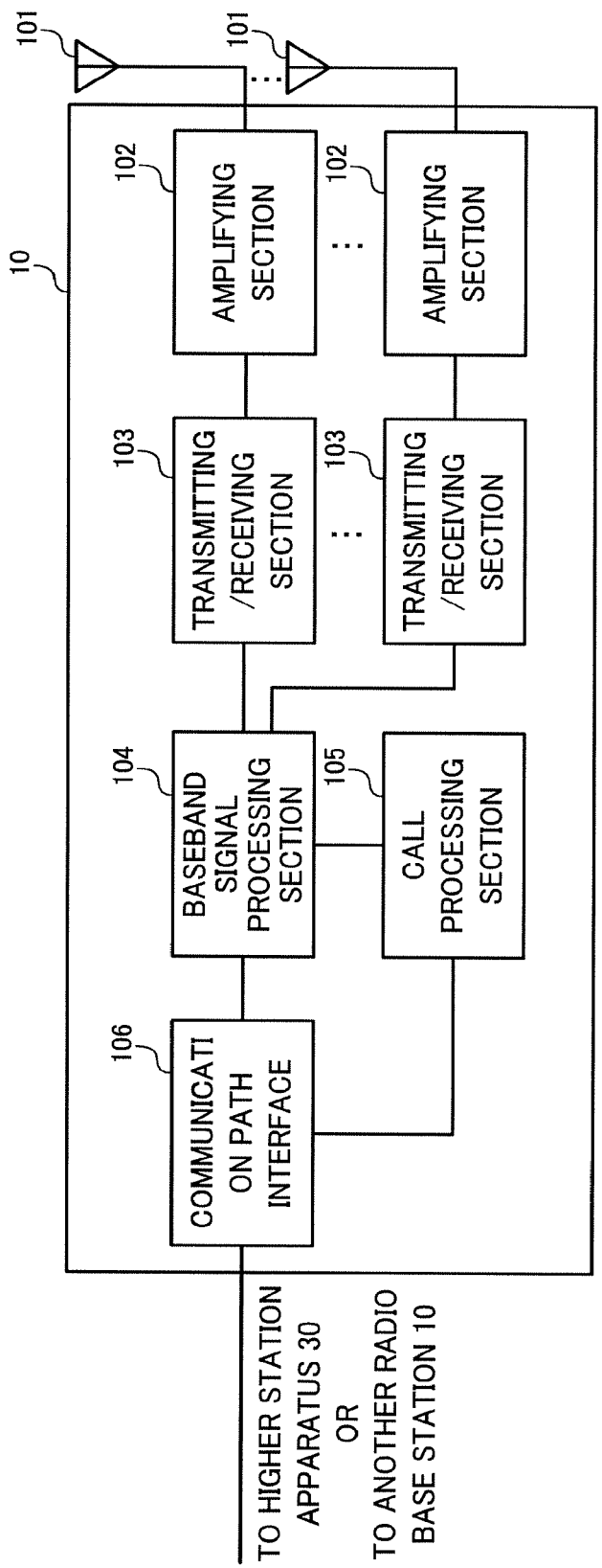
FIG. 10 is a diagram to show an example of an overall structure of a radio base station according to an embodiment of the present invention.

FIG. 10 is a diagram to show an overall structure of a radio base station 10 according to the present embodiment. The radio base station 10 has a plurality of transmitting/receiving antennas 101 for MIMO communication, amplifying sections 102, transmitting/receiving sections (receiving sections) 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, which are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

On the other hand, as for uplink signals, radio frequency signals that are received in the transmitting/receiving antennas 101 are each amplified in the amplifying sections 102. Each transmitting/receiving section 103 receives the uplink signals amplified in the amplifying sections 102. The transmitting/receiving section 103 converts the received signals into baseband signals through frequency conversion, and outputs the resulting signals to the baseband signal processing section 104.

In the baseband signal processing section 104, user data that is included in the uplink signals that are input is subjected to an fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Furthermore, the interface section 106 transmits and receives signals to and from neighboring radio base stations (backhaul signaling) via an inter-base station interface (for example, optical fiber, the X2 interface, etc.).

Figure 11:
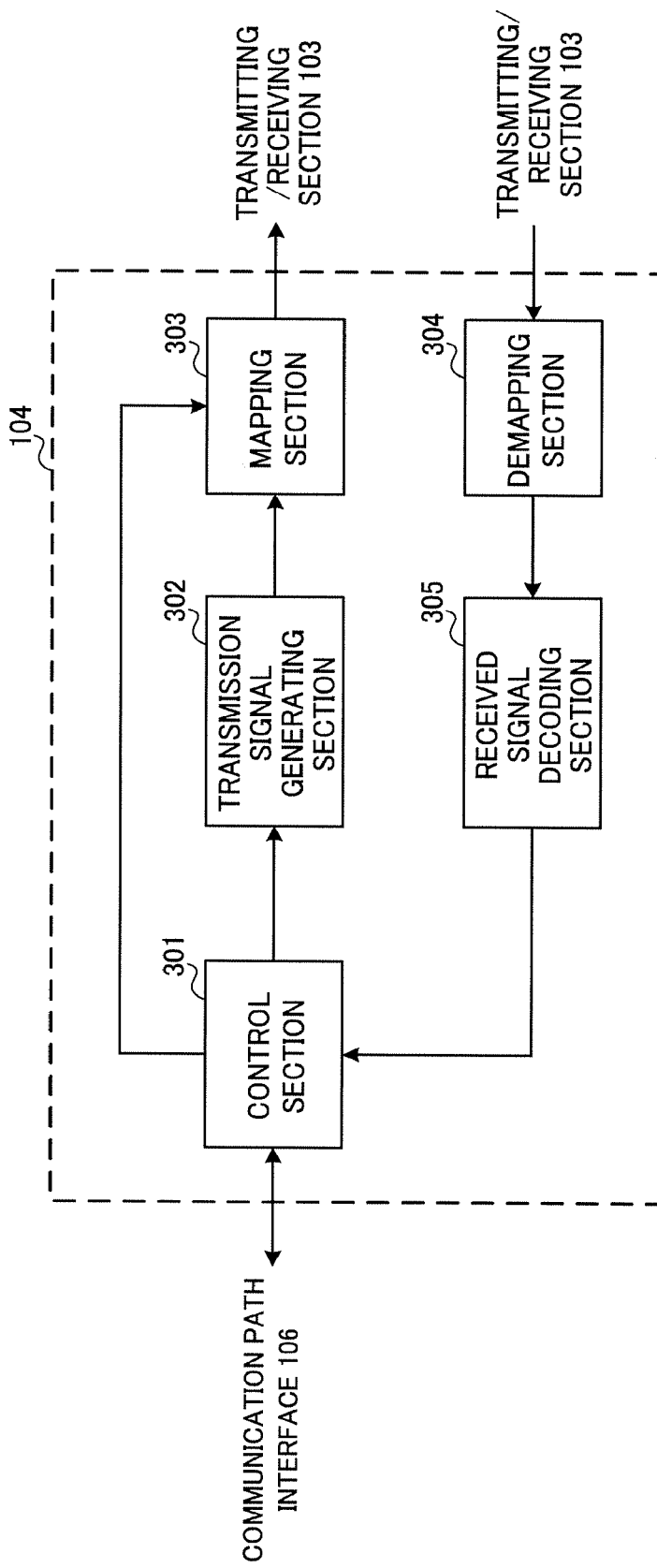
FIG. 11 is a diagram to show an example of a functional structure of a radio base station according to an embodiment of the present invention.

FIG. 11 is a diagram to show a principle functional structure of the baseband signal processing section 104 provided in the radio base station 10 according to the present embodiment. As shown in FIG. 11, the baseband signal processing section 104 provided in the radio base station 10 is comprised at least of a control section 301, a transmission signal generating section 302, a mapping section 303, a demapping section 304 and a received signal decoding section 305.

The control section 301 controls the allocation of radio resources to downlink signals and uplink signals based on command information from the higher station apparatus 30, feedback information from each user terminal 20, and so on. That is, the control section 301 functions as a scheduler. Note that, when another radio base station 10 and/or the higher station apparatus 30 functions as the scheduler of the radio base station 10, the control section 301 does not have to function as a scheduler.

To be more specific, the control section 301 controls the scheduling of downlink reference signals, downlink data signals that are transmitted in the PDSCH, downlink control signals that are transmitted in the PDCCH and/or the EPDCCH, and so on. Also, the control section 301 controls the scheduling of uplink reference signals, uplink data signals that are transmitted in the PUSCH, uplink control signals that are transmitted in the PUCCH and/or the PUSCH, RA preambles that are transmitted in the PRACH, and so on. These pieces of allocation control-related information are reported to the user terminal 20 by using downlink control information (DCI).

Furthermore, the control section 301 may control the transmission signal generating section 302 and the mapping section 303 so as to adjust the uplink signal transmission power of the user terminals 20 connected with the radio base station 10.

To be more specific, the control section 301 can control the transmission signal generating section 302 to issue transmission power control (TPC) commands for controlling uplink signal transmission power and control the mapping section 303 to include TPC commands in downlink control information (DCI) and report this to the user terminals 20, based on PHRs (Power Headroom Reports) and channel state information (CSI) reported from the user terminals 20, the uplink data error rate, the number of HARQ retransmissions, and so on. By this means, the radio base station 10 can specify the uplink signal transmission power to request to the user terminals 20. Note that the PHRs may be included and reported in MAC CE as well.

The control section 301 acquires information about the uplink transmission power for each radio base station 10, with which the user terminals 20 are connected, based on the PHRs reported from the user terminals 20. To be more specific, the control section 301 acquires information about the transmission power of the cell where the subject radio base station belongs, based on PHRs reported from the user terminals 20. Note that, as information about the transmission power of cells where the subject radio base station does not belong, the control section 301 may estimate the PUSCH bandwidth, channel states (path loss and so on), transmission power density (PSD), MCS level, channel quality and so on of cells formed by other radio base stations 10. Also, the control section 301 may estimate (calculate) the total extra transmission power of the user terminals 20 from these pieces of information.

Also, the control section 301 controls the transmission signal generating section 302 and the mapping section 303 to generate terminal-specific information related to the maximum transmission power of uplink signals and transmit this to the user terminals 20. This terminal-specific information may be, for example, the maximum transmission power $Q_{EMAX,c}$ per serving cell (first embodiment), the maximum transmission power $P_{eNB}$ per radio base station (second embodiment), and so on.

Note that the terminal-specific information is preferably determined so that the sum of the maximum transmission power indicated by the terminal-specific information pertaining to each radio base station 10, with which the user terminals 20 are connected, equals or falls below the maximum transmission power of the user terminals 20. Consequently, the control section 301 may exchange terminal-specific information with the higher station apparatus 30, other radio base stations 10 and so on, via the communication path interface 106, and determine the maximum transmission power to include in the terminal-specific information. Also, when the maximum transmission power values are associated with predetermined indices, the terminal-specific information may include the above indices to represent the maximum transmission power values, so that the user terminals 20 can derive the maximum transmission power from the indices.

The downlink control signal generating section 302 generates downlink control signals, downlink data signals, downlink reference signals and so on that are determined to be allocated by the control section 301. To be more specific, the downlink control signal generating section 302 generates DL assignments, which report downlink signal allocation information, and UL grants, which report uplink signal allocation information, based on commands from the control section 301. Also, the data signals that are generated in the data signal generating section 303 are subjected to a coding process and a modulation process, based on coding rates and modulation schemes that are determined based on CSI from each user terminal 20 and so on.

Also, based on commands from the control section 301, the transmission signal generating section 302 generates higher layer signaling (for example, RRC signaling) to include terminal-specific information as downlink data signals. The terminal-specific information may be structured to be included in information elements.

The mapping section 303 maps the downlink signals generated in the transmission signal generating section 302 to radio resources based on commands from the control section 301, and outputs these to the transmitting/receiving sections 103.

The demapping section 304 demaps the signals received in the transmitting/receiving sections 103 and outputs the separated signals to the received signal decoding section 305. To be more specific, the demapping section 304 demaps the uplink signals transmitted from the user terminals 20.

The received signal decoding section 305 decodes the signals (for example, delivery acknowledgement signals (HARQ-ACK)) transmitted from the user terminals 20 in uplink control channels (the PRACH, the PUCCH, etc.), the data signals transmitted in the PUSCH, and so on, and outputs the results to the control section 301. Also, information included in the MAC CE reported from the user terminals 20 is also output to the control section 301.

Figure 12:
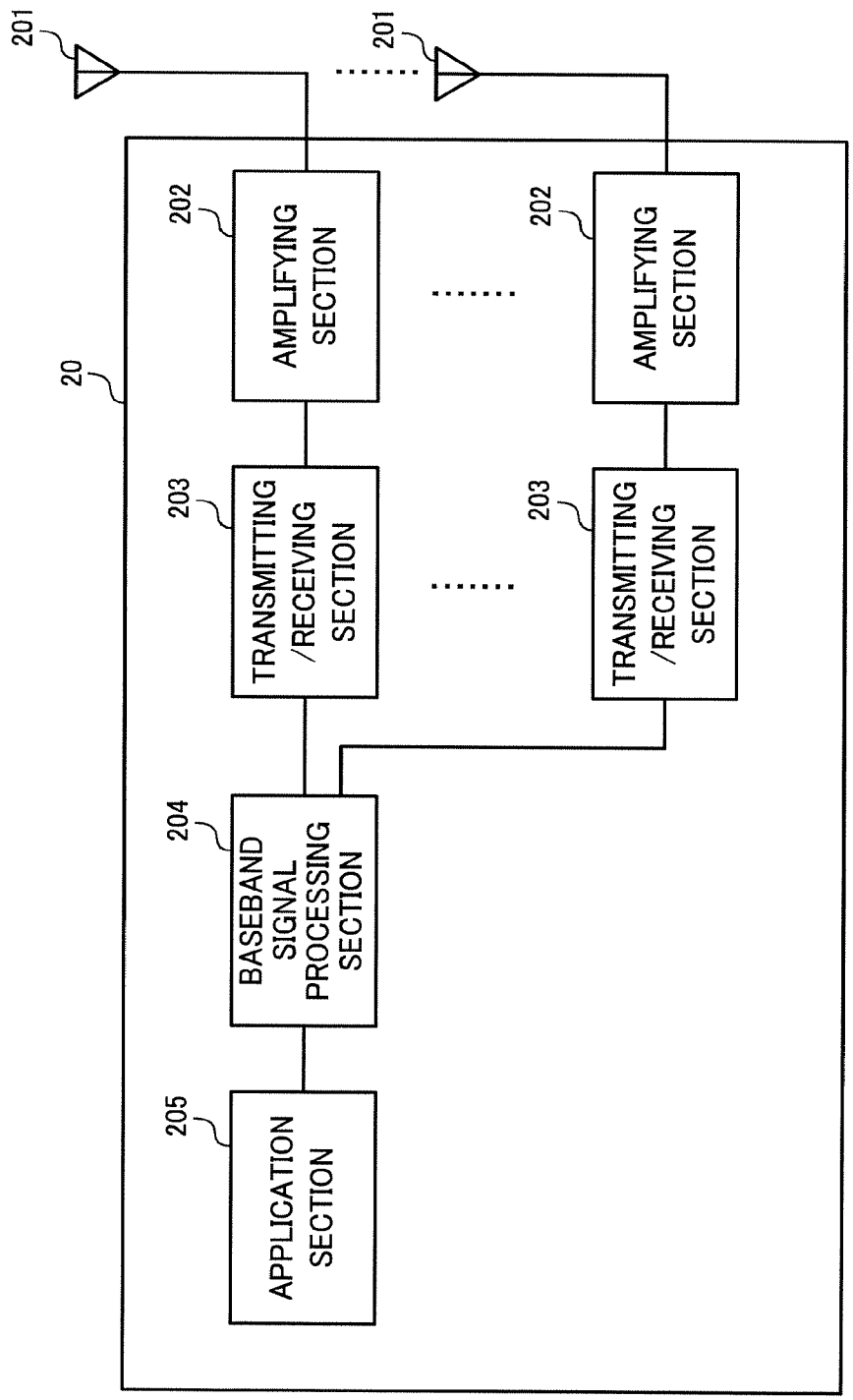
FIG. 12 is a diagram to show an example of an overall structure of a user terminal according to an embodiment of the present invention.

FIG. 12 is a diagram to show an overall structure of a user terminal 20 according to the present embodiment. As shown in FIG. 12, the user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmitting sections and receiving sections.

As for downlink data, radio frequency signals that are received in a plurality of transmitting/receiving antennas 201 are each amplified in the amplifying sections 202. Each transmitting/receiving section 203 receives the downlink signals amplified in the amplifying section 202. The transmitting/receiving sections 203 converts the received signals into baseband signals through frequency conversion and outputs the resulting signals to the baseband signal processing section 204.

In the baseband signal processing section 204, the baseband signals that are input are subjected to an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. In the baseband signal processing section 204, a retransmission control transmission process (for example, HARQ transmission process), channel coding, precoding, a discrete Fourier transform (DFT) process, an IFFT process and so on are performed, and the result is forwarded to each transmitting/receiving section 203. The baseband signal that is output from the baseband signal processing section 204 is converted into a radio frequency band in the transmitting/receiving sections 203. The amplifying sections 202 amplify the radio frequency signals having been subjected to frequency conversion, and transmit the resulting signals from the transmitting/receiving antennas 201.

Figure 13:
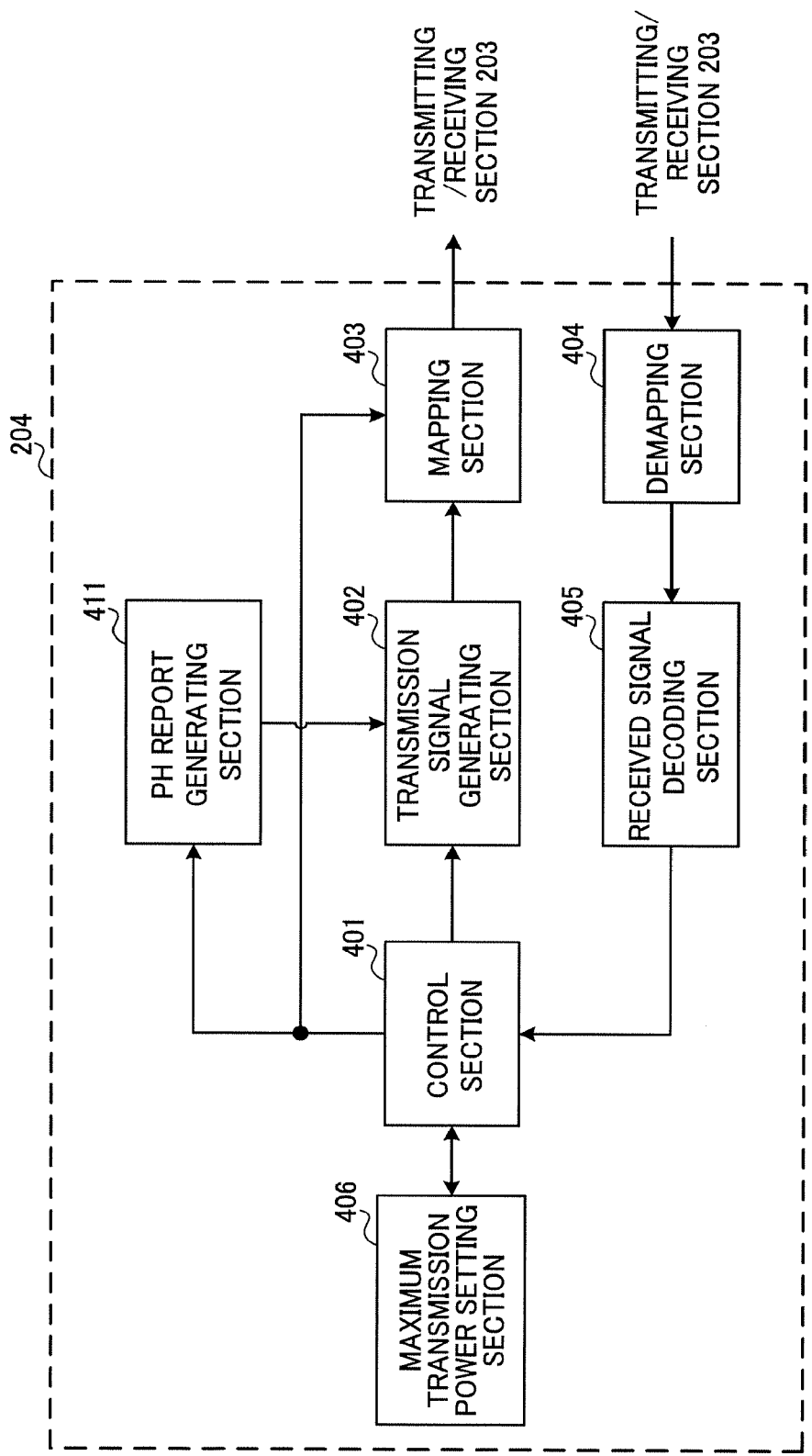
FIG. 13 is a diagram to show an example of a functional structure of a user terminal according to an embodiment of the present invention.

FIG. 13 is a diagram to show a principle functional structure of the baseband signal processing section 204 provided in the user terminal 20. As shown in FIG. 13, the baseband signal processing section 204 provided in the user terminal 20 is comprised at least of a control section 401, a transmission signal generating section 402, a mapping section 403, a demapping section 404, a received signal decoding section 405, a maximum power configuration section 406 and a PH report generating section 411.

The control section 401 acquires the downlink control signals (signals transmitted in the PDCCH) and the downlink data signals (signals transmitted in the PDSCH) transmitted from the radio base stations 10, from the received signal decoding section 405. Based on the downlink control signals, results of deciding whether or not retransmission control is possible in response to the downlink data signals, and so on, the control section 401 controls the generation of uplink control signals (for example, delivery acknowledgement signals (HARQ-ACK), etc.), uplink data signals, and so on. To be more specific, the control section 401 controls the transmission signal generating section 402 and the mapping section 403.

The transmission signal generating section 402 generates uplink control signals such as, for example, delivery acknowledgement signals (HARQ-ACK) and channel state information (CSI), based on commands from the control section 401. Also, the transmission signal generating section 402 generates uplink data signals based on commands from the control section 401. Note that, when a UL grant is included in a downlink control signal reported from the radio base stations, the control section 401 commands the transmission signal generating section 402 to generate an uplink data signal.

The mapping section 403 maps the uplink signals generated in the transmission signal generating section 402 to radio resources based on commands from the control section 401, and outputs the result to the transmitting/receiving sections 203.

Also, the control section 401 controls the uplink transmission power of the user terminals 20. To be more specific, the control section 401 controls the transmission power of each cell (CC) based on signaling (for example, TPC commands) from each radio base station 20. Here, the control section 401 controls the uplink transmission power to be equal to or lower than the maximum transmission power of uplink signals for each radio base station 10, set in the maximum transmission power setting section 406. To do so, the control section 401 outputs the terminal-specific information related to the maximum transmission power of uplink signals included in, for example, the higher layer signaling that is received.

Based on the terminal-specific information pertaining to a given radio base station input from the control section 401, the maximum transmission power setting section 406 sets the maximum transmission power of uplink signals for the given radio base station. Also, the maximum transmission power setting section 406 outputs the information related to the maximum transmission power of uplink signals set for each radio base station, to the control section 401.

For example, the maximum transmission power setting section 406 sets the maximum transmission power $P_{CMAX\_MeNB,c}$ per serving cell formed by the MeNB, by using $Q_{EMAX\_MeNB,c}$ reported from the MeNB, based on equations 3 and 4. Also, the maximum transmission power setting section 406 sets the maximum transmission power $P_{CMAX\_SeNB,c}$ per serving cell formed by the SeNB, by using $Q_{EMAX\_SeNB,c}$ reported from SeNB, based on equation 5 and 6 (first embodiment).

Also, the maximum transmission power setting section 406 may set the maximum transmission power $P_{CMAX\_MeNB}$ per MeNB, by using $P_{MeNB}$ reported from the MeNB, based on equations 9 and 10. Also, the maximum transmission power setting section 406 may set the maximum transmission power $P_{CMAX\_SeNB}$ per SeNB by using $P_{SeNB}$ that is reported from the SeNB, based on equations 11 and 12 (second embodiment).

Furthermore, once the maximum transmission power setting section 406 set the maximum transmission power with respect to a given eNB, the maximum transmission power for the rest of the eNBs can be determined to be included within the range defined by removing the maximum transmission power of the given eNB from the maximum transmission power of the user terminals 20 (third embodiment). For example, when connections are established with three eNBs, after the maximum transmission power is determined with respect to two of the eNBs based on terminal-specific information, the power that is left after the maximum transmission power determined with respect to the two eNBs is removed from $P_{CMAX}$ may be determined to be the upper limit of the maximum transmission power of the remaining one eNB.

Note that the transmission signal generating section 402 may generate, as user terminal capability information (UE capability information), the fact that the maximum transmission power of uplink signals for a given radio base station can be set in the maximum transmission power setting section 406 based on terminal-specific information.

Based on commands from the control section 401, the PH reporting generating section 411 calculates the PH (Power Headroom) for each eNB/CG from the difference between the uplink signal transmission power demanded by the eNB/CG and the maximum transmission power of uplink signals for that eNB/CG, generates a PHR, and outputs this to the transmission signal generating section 402. Note that the PHR may be generated based on the upper limit of the maximum transmission power of uplink signals for the eNBs/CGs.

The demapping section 404 demaps the signals received in the transmitting/receiving sections 203 and outputs the separated signals to the received signal decoding section 405. To be more specific, the demapping section 404 demaps the downlink signals transmitted from the radio base station 10.

The received signal decoding section 405 decodes the downlink control signals (PDCCH signals) transmitted in the downlink control channel (PDCCH), and outputs the scheduling information (uplink resource allocation information), information about the cells to which delivery acknowledgement signals are fed back in response to the downlink control signals, TPC commands and so on, to the control section 401.

Now, although the present invention has been described in detail with reference to the above embodiments, it should be obvious to a person skilled in the art that the present invention is by no means limited to the embodiments described herein. For example, the above-described embodiments may be used separately, or may be used in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A user terminal comprising:
a receiver that receives a master cell group configuration and receives a secondary cell group configuration, the master cell group configuration including a first higher-layer parameter related to a maximum transmission power of uplink signals for the master cell group; and
a processor that determines an upper limit and a lower limit of the maximum transmission power for the master cell group based on the first higher-layer parameter, and sets the maximum transmission power for the master cell group within a range of the upper limit and the lower limit of the maximum transmission power for the master cell group.

2. The user terminal according to claim 1, wherein the secondary cell group configuration includes a second higher-layer parameter indicating a maximum transmission power of uplink signals for the secondary cell group, and
wherein the processor determines an upper limit and a lower limit of the maximum transmission power for the secondary cell group based on the second higher-layer parameter, and sets the maximum transmission power for the secondary cell group within a range of the upper limit and the lower limit of the maximum transmission power for the secondary cell group.

3. The user terminal according to claim 2, wherein the processor is configured to:
set a minimum value, out of the first higher-layer parameter related to a maximum transmission power of the master cell group and a predetermined value, as the upper limit of the maximum transmission power for the master cell group; and
set a minimum value, out of the second higher-layer parameter related to a maximum transmission power of the secondary cell group and a predetermined value, as the upper limit of the maximum transmission power for the secondary cell group.

4. The user terminal according to claim 3, wherein the processor is configured to:
set a minimum value, out of a value obtained by subtracting a first offset value from the first higher-layer parameter and a value obtained by subtracting a value based on a first maximum power reduction and a first additional maximum power reduction from the predetermined value, as the lower limit of the maximum transmission power for the master cell group; and
set a minimum value, out of a value obtained by subtracting a second offset value from the second higher-layer parameter and a value obtained by subtracting a value based on a second maximum power reduction and a second additional maximum power reduction from the predetermined value, as the lower limit of the maximum transmission power for the secondary cell group.

5. A radio communication method for a user terminal comprising:
receiving a master cell group configuration and receiving a secondary cell group configuration, the master cell group configuration including a first higher-layer parameter related to a maximum transmission power of uplink signals for the master cell group; and
determining an upper limit and a lower limit of the maximum transmission power for the master cell group based on the first higher-layer parameter, and setting the maximum transmission power for the master cell group within a range of the upper limit and the lower limit of the maximum transmission power for the master cell group.

* * * * *